May 28, 1940.  M. KLAVIK  2,202,456
AUTOMOBILE BODY
Filed Dec. 20, 1938
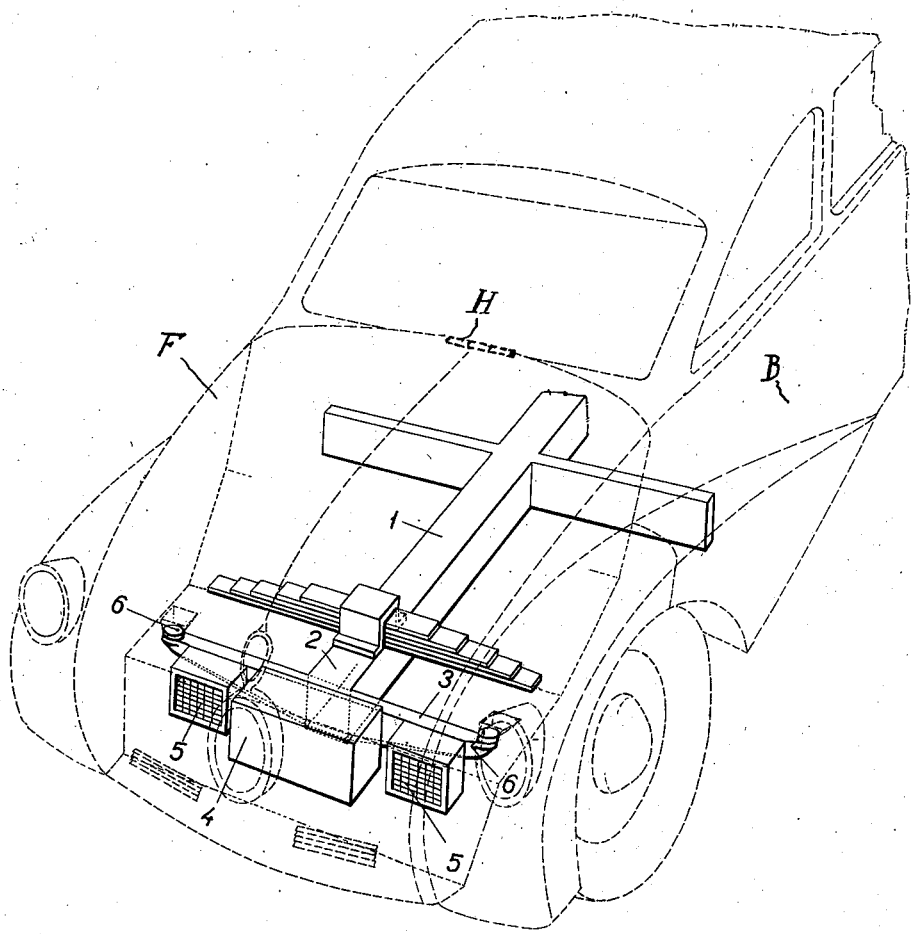
Inventor
Milos Klavik
By B. Singer
Attorney Patented May 28, 1940

2,202,456

UNITED STATES PATENT OFFICE 2,202,456

AUTOMOBILE BODY

Miloš Klavík, Prague, Czechoslovakia

Application December 20, 1938, Serial No. 246,916
In Czechoslovakia August 24, 1937

1 Claim. (Cl. 180—1)

In a copending application of the applicant filed December 20, 1938, Serial No. 246,915, there is described the arrangement of a body front part constructed in the form of a spare box hingedly connected to the actual body.

As the accumulator battery and the radiators for cooling the oil used in the engine are frequently accommodated in this front part, it might be rather difficult to lift this box with the batteries, firstly on account of its considerable weight and secondly also because with frequent lifting, the liquid could leak out of the battery in the case of accidental leakage of the stoppers. Then again, in the case of the oil radiator, for moving the entire front part on hinges as a unit, it would be necessary to provide flexible connections which, however, would soon leak.

This difficulty is obviated in the present construction by providing on the end of the supporting member of the chassis of the automobile a transverse bearer, on which both the battery and the oil radiator are mounted, said bearer being advantageously provided with resilient stops which carry the weight of the box or body front part in its lowered position.

A constructional example of the invention is shown in the accompanying drawing.

The longitudinal frame bearer 1 of for example rectangular cross-section carries at its front end 2 the auxiliary transverse bearer 3 on which are mounted the battery 4 and also the oil radiators 5. On both ends of this transverse bearer are secured the rubber buffers 6, on which the front box part of the body rests where the front box part of the body is located in its lowered position. The front box part F is hinged, at H, to the main body part B¹.

I claim:

In an automobile with rear engine having a main body part and a front box part hinged on the main body, a transverse bearer carried on a longitudinal chassis member, accessory components carried on the transverse bearer and resilient buffers mounted on both ends of the transverse bearer on which the hinged front part of the body rests when it is in its lowered position. tions which, however, would soon leak.

MILOŠ KLAVÍK.